United States Patent [19]

Kim

[11] Patent Number: 6,035,269
[45] Date of Patent: Mar. 7, 2000

[54] METHOD FOR DETECTING STYLISTIC ERRORS AND GENERATING REPLACEMENT STRINGS IN A DOCUMENT CONTAINING JAPANESE TEXT

[75] Inventor: Hyun-suk Kim, Bellevue, Wash.

[73] Assignee: Microsoft Corporation, Redmond, Wash.

[21] Appl. No.: 09/103,207

[22] Filed: Jun. 23, 1998

[51] Int. Cl.[7] .............................. G06F 17/27; G06F 17/28; G06F 17/21
[52] U.S. Cl. ......................... 704/9; 704/8; 704/2; 704/4; 707/536
[58] Field of Search ............................. 704/9, 8, 10, 1; 707/535, 536, 532, 531, 533

[56] References Cited

U.S. PATENT DOCUMENTS

| | | | |
|---|---|---|---|
| 4,914,590 | 4/1990 | Loatman et al. ............................. | 704/8 |
| 5,251,129 | 10/1993 | Jacobs et al. ................................ | 704/9 |
| 5,268,840 | 12/1993 | Chang et al. ................................ | 704/9 |
| 5,321,801 | 6/1994 | Ando ....................................... | 707/535 |
| 5,323,316 | 6/1994 | Kadashevich et al. ...................... | 704/9 |
| 5,331,556 | 7/1994 | Black, Jr. et al. ........................... | 704/9 |
| 5,369,577 | 11/1994 | Kadashevich et al. ...................... | 704/2 |
| 5,497,319 | 3/1996 | Chong et al. ................................ | 702/2 |
| 5,528,491 | 6/1996 | Kuno et al. .................................. | 704/9 |
| 5,535,119 | 7/1996 | Ito et al. ..................................... | 704/3 |
| 5,535,121 | 7/1996 | Roche et al. ................................ | 704/9 |
| 5,634,066 | 5/1997 | Takehara et al. ......................... | 707/535 |
| 5,634,134 | 5/1997 | Kumai et al. ............................ | 707/536 |
| 5,708,829 | 1/1998 | Kadashevich et al. .................. | 707/531 |
| 5,778,361 | 7/1998 | Nanjo et al. ................................. | 707/5 |
| 5,799,269 | 8/1998 | Schabes et al. ............................. | 704/9 |
| 5,946,648 | 8/1999 | Halstead, Jr. et al. ....................... | 704/9 |

OTHER PUBLICATIONS

Cormen et al., "Dynamic Programming," Chapter 16, *Introduction to Algorithms*, The MIT Press, Cambridge, MA, ©1990 by the Massachusetts Institute of Technology, pp. 301–312.

*Primary Examiner*—Joseph Thomas
*Attorney, Agent, or Firm*—Jones & Askew, LLP

[57] ABSTRACT

Critiques are applied to phrase units included in morpho-syntactical information derived from the Japanese text. The critiques include a "trigger" and an "action," and are written in a special-purpose syntax that allows for easy specification of the error class and the rewrite generation. If a critique's trigger condition is satisfied, the associated action is carried out in order to generate a replacement text string. The process of generating replacement text strings employs a morphological graph that reflects possible word formations. In a first pass through the graph, a breadth first search is used to identify intermediate nodes along a path whose morpheme transitions satisfy at least part of the attributes of the text. In a second pass, a depth first search is used to select only those morpheme transitions that completely satisfy the rewrite criteria specified in the critique, while traversing the nodes identified in the breadth first search. The morpheme transitions identified during the depth first search provide the text string that is used to replace the original phrase.

10 Claims, 12 Drawing Sheets

```
     435  420              425      430
405 ┌ 今日 (Adv) ; ADV ;  今日; M_PosP Top
    │ は (M_mod_ha)
    └ = 43
    ┌ 休 (GOmu) ; VERB ;休む; Aux AuxCaus Sairi
410 │ まさせ (INFL_verb_1cause)
    │ て (FOP_INFL_vAUX_te_itadaku)
    └ = 0
    ┌ いただ (FOP_INFL_vAUX_te_itadaku) ; VERB ;  いただく; Pol Pres Recv
415 │ きます (INFL_vAUX_2masu_3)
    │ 。 (Sym) ; CHAR ; 。;
    └ = 0
```

FIG.4b

Critique #1:
    Trigger:      505a
        [X:Bit (Sairi)]
    Action:             510a
        (X-> X.Generate(,,-Sairi))

Critique #2:
    Trigger:      505b
        [X:Bit (Ranuki)]
    Action:                    510b
        (X-> X.Generate(,,-Ranuki -Contr))

FIG. 5

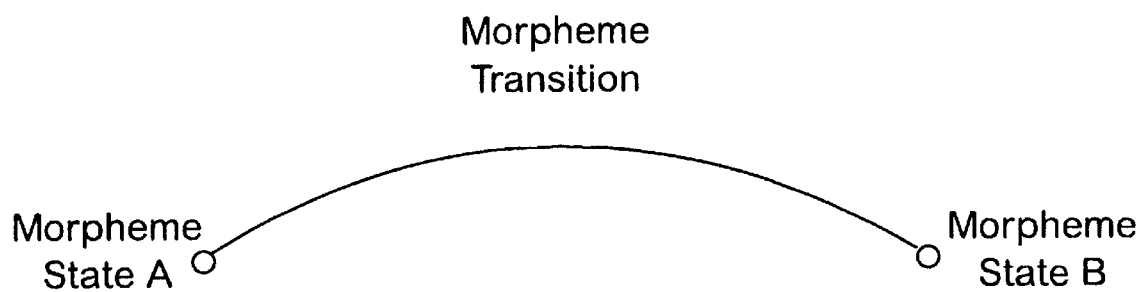
FIG. 6a
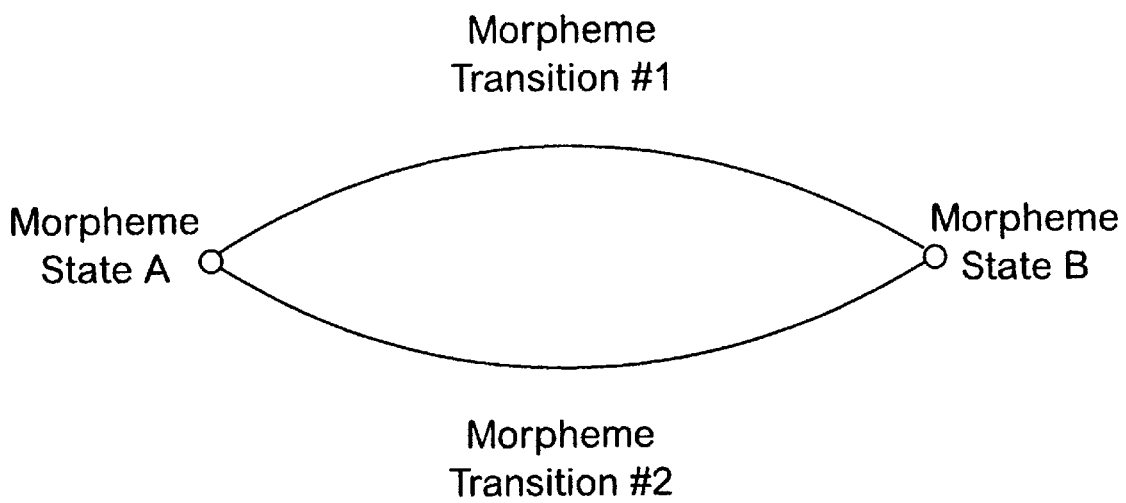
FIG. 6b

食べれる (tabereru)

食 (ta)　　　Stem (to eat)

べれ (bere)　morpheme #1
　　　　　　　　"Ranuki"　(ra contraction)
　　　　　　　　"contr"　　(contraction)
　　　　　　　　"passive"　(passive)

る (ru)　　　morpheme #1
　　　　　　　　"pres"　　(present)

FIG. 8a

食べられる (taberareru)

食 (ta)　　　　Stem (to eat)

べられ (berare)　morpheme #1'
　　　　　　　　　　"passive"　(passive)

る (ru)　　　　morpheme #2
　　　　　　　　　　"pres"　　(present)

FIG. 8b

METHOD FOR DETECTING STYLISTIC ERRORS AND GENERATING REPLACEMENT STRINGS IN A DOCUMENT CONTAINING JAPANESE TEXT

TECHNICAL FIELD

The present invention relates to word processing systems, and more particularly relates to detecting stylistic errors and generating replacement strings in documents that contain Japanese text.

BACKGROUND OF THE INVENTION

Spelling checkers, style checkers, and grammar checkers are common in modern word processing programs. The Japanese language presents interesting problems in this area because of several characteristics of the written language. First, the Japanese language employs several different alphabets, which may be used in combination. Second, Japanese text is typically written without any spaces between words. Third, the Japanese language is highly inflectional, which means Japanese words can undergo significant spelling changes to indicate case, gender, number, tense, person, mood, or voice.

The most commonly used Japanese alphabets (or writing systems) are Kanji, Hiragana, and Katakana. The Kanji alphabet includes pictographs or ideographic characters that were adopted from the Chinese alphabet. Hiragana and Katakana are phonetic alphabets that do not include any characters common to each other or to Kanji. Hiragana is used to spell words of Japanese origin. Katakana is used to spell words of foreign (primarily western) origin. Kanji pictographs are analogous to shorthand variants of Hiragana words in that any Kanji word can be written in Hiragana, though the converse is not true. A single Japanese word can include characters from more than one alphabet.

One of the functions performed by style checkers is to detect malformed phrases and suggest replacement text strings. One approach to performing style checking is to use error-rewrite pairs to identify malformed phrases and suggest replacement strings. It is theoretically possible to have a list of virtually all possible errors and a corresponding list of replacement or rewrite strings. Although this approach is straightforward, it would require a very large number of rules and a large amount of memory.

An alternative to using specific error-rewrite pairs is to define error classes, which would allow the number of rules to be drastically reduced. However, this approach requires the style checker to "generate" a replacement string based on the error that is detected and the correction that needs to be made. Phrase reconstruction can be accomplished by employing graph searching logic to arrive at a suitable replacement string. This type of approach would typically employ a breadth first search or a depth first search.

Depth first searching turns out to be impractical in this context because the search algorithm always goes to the specified maximum level in the hierarchy. This results in one of two problems: (1) no search results are obtained because the maximum specified level is insufficient; or (2) excessive searching time is required to search sufficient levels.

Breadth first searching is capable of finding the shortest match before all other matches, but is also impractical because of the amount of storage and computational power required. In a typical scenario, one level of morpheme transitions requires approximately 100 new child nodes. Thus, mere three levels of transitions would require that more than 1 million nodes be searched. This amount of searching is unacceptable in microcomputer environments in terms of both the amount of memory and time required.

Therefore, there is a need in the art for an improved method for identifying malformed Japanese text and generating replacement strings for the malformed text. An acceptable solution should be small enough (in terms of memory requirements) and fast enough to perform satisfactorily in a desktop computer environment.

SUMMARY OF THE INVENTION

The present invention satisfies the above-described needs by providing an improved method for detecting stylistic errors and generating replacement strings in documents containing Japanese text. The present invention employs critiques that are applied to morpho-syntactical information derived from the Japanese text. The critiques include a "trigger" and an "action," which specify the error class and the rewrite generation. If a critique's trigger condition is satisfied, the associated action is carried out in order to generate a replacement text string. The process of generating replacement text strings employs a morphological graph, which reflects possible word formations. A first search is used to identify intermediate nodes along a path whose morpheme transitions satisfy at least part of the attributes of the text. A second search is used to select only those morpheme transitions that completely satisfy the rewrite criteria specified in the critique, while traversing the nodes identified in the first search. The morpheme transitions identified during the depth first search provide the text string that is used to replace the original phrase.

Generally described, the present invention provides a method for generating a substitute text string. The method includes providing a morphological graph that includes a first state, a last state, and at least one morpheme transition between the first state and the last state. Morpho-syntactical data associated with an original phrase is received for processing. The morpho-syntactical data includes a stem corresponding to the first state, at least one bound morpheme, and attribute bits describing the original phrase. A critique, which includes a trigger and an action, is applied to the morpho-syntactical data. If the trigger condition is satisfied by the morpho-syntactical data, the method includes preparation of a morpheme list and a bit list that correspond to the action in the critique. Next, the morphological graph is traversed by the first pass from the last state to the first state in a breadth-first manner. The first pass's path is determined by the contents of the morpheme list and the bit list, and it typically includes at least one intermediate node. After the first traversal, the morphological graph is traversed by the second pass from the first state to the last state in a depth-first manner following the nodes taken by the first pass. Finally, a substitute string corresponding to the reconstructed path is provided.

In another aspect, the present invention provides a computer-readable medium that includes morphological graph data and computer-executable instructions. The morphological data represents a first state, a last state, and at least one morpheme transition between the first state and the last state. The computer-executable instructions include applying a critique to morpho-syntactical data associated with an original phrase. The critique includes a trigger and an action. The morpho-syntactical data includes a stem corresponding to the first state, at least one bound morpheme, and attribute bits describing the original phrase. If the trigger is satisfied by the morpho-syntactical data, the instructions include preparing a morpheme list and a bit list corresponding to state of morpho-syntactical data. The morpheme list and bit list are then altered in accordance with the action. The morphological graph data is then traversed by the first pass from the last state to the first state in a breadth-first manner, with the path being determined by the contents of the morpheme list and the bit list, and typically including at least one intermediate node. Then the morphological graph data is traversed by the second pass from the first state to the last state in a depth-first manner following the nodes taken by the first pass. Finally, a substitute string is provided, where the substitute string corresponds to the reconstructed path and includes the stem and replacement morphemes, which are derived from the path and correspond to the morpheme transitions traversed along the path.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 4, consisting of FIGS. 4a and 4b, illustrates a string of Japanese text and the morpho-syntactical information generated by the word breaking component of FIG. 2.

FIG. 5 illustrates two exemplary critiques that can be employed to detect and correct malformed phrases in the morpho-syntactical information of FIG. 4b.

FIG. 8, consisting of FIGS. 8a–8b, illustrates exemplary phrases and their constituent morphemes.

DETAILED DESCRIPTION

Figure 1:
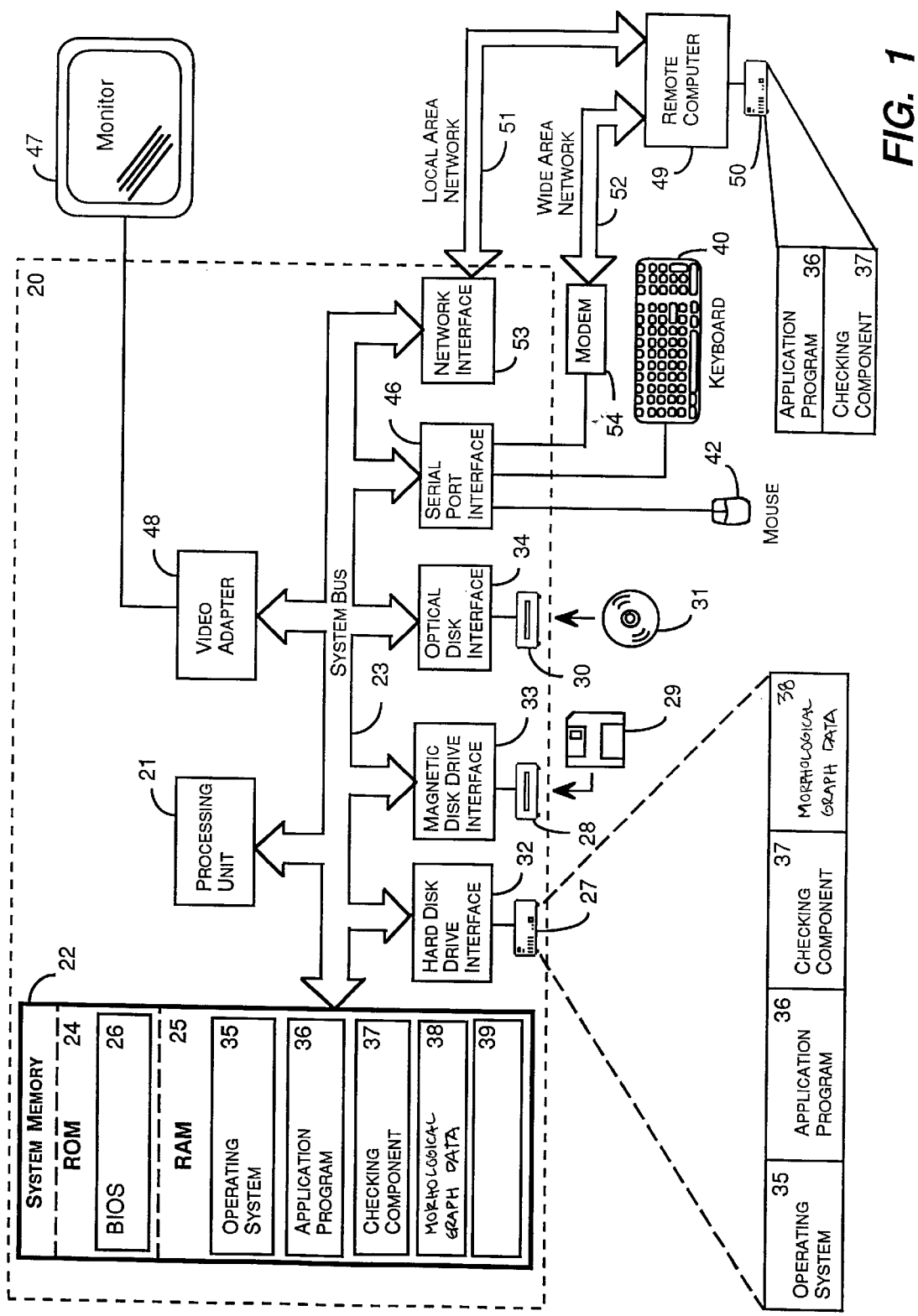
FIG. 1 is a block diagram of a personal computer that provides the operating environment for an embodiment of the present invention.

The present invention is directed to an improved method for detecting stylistic errors and generating replacement strings in documents containing Japanese text. In an exemplary embodiment, the present invention employs critiques that are applied to morpho-syntactical information derived from the Japanese text. The text is divided into phrase units, and the critiques are applied to these phrases. The critiques include a "trigger" and an "action," and are written in a special-purpose syntax that allows for easy specification of the error class and the rewrite generation. If a critique's trigger condition is satisfied, the associated action is carried out in order to generate a replacement text string. For example, a critique's trigger may be defined to detect the presence of a contraction, and the associated action may be defined to generate a word or phrase that has the same meaning but without using the contracted form of the word. The process of generating replacement text strings employs a morphological graph, which reflects possible word formations. In a first pass through the graph, a breadth first search is used to identify intermediate nodes along a path whose morpheme transitions satisfy at least part of the attributes of the text. In a second pass, a depth first search is used to select only those morpheme transitions that completely satisfy the rewrite criteria specified in the critique, while traversing the nodes identified in the breadth first search. The morpheme transitions identified during the depth first search provide the text string that is used to replace the original phrase.

Referring now to the drawings, in which like numerals represent like elements throughout the several figures, aspects of the present invention and an exemplary operating environment will be described.

EXEMPLARY OPERATING ENVIRONMENT

FIG. 1 and the following discussion are intended to provide a brief, general description of a suitable computing environment in which the present invention may be implemented. While the invention will be described in the general context of an application program and dynamic-link library (DLL) that runs under an operating system on a personal computer, those skilled in the art will recognize that the invention also may be implemented in other types and combinations of program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules and data files may be stored in the drives and RAM 25, including an operating system 35, one or more application programs 36, a checking component 37, and morphological graph data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

DETECTING STYLISTIC ERRORS AND GENERATING REPLACEMENT TEXT STRINGS

The present invention provides an improved method for generating replacement strings for malformed Japanese text based on broadly defined error classes. Generally described, the present invention employs critiques that are applied to morpho-syntactical information derived from the Japanese text. Text is divided into phrase units, and the critiques are applied to these phrases. The critiques include a "trigger" and an "action," and are written in a special-purpose syntax that allows for easy specification of the error class and the rewrite generation. If a critique's trigger condition is satisfied, the associated action is carried out in order to generate a replacement text string. For example, a critique's trigger may be defined to detect the presence of a contraction, and the associated action may be defined to generate a word or phrase that has the same meaning but without using the contracted form of the word. Other types of common stylistic errors that can be corrected include additions of redundant morphemes and inappropriate levels of politeness.

Figure 2:
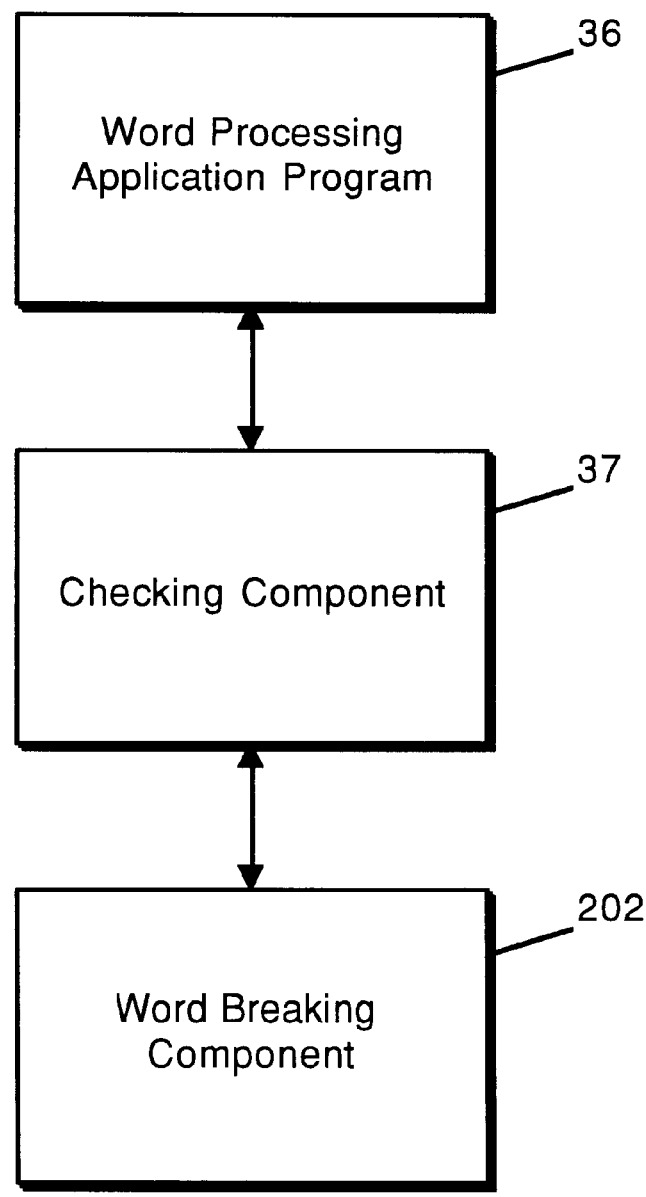
FIG. 2 is a block diagram illustrating the primary program modules employed in an embodiment of the present invention.
Figure 3:
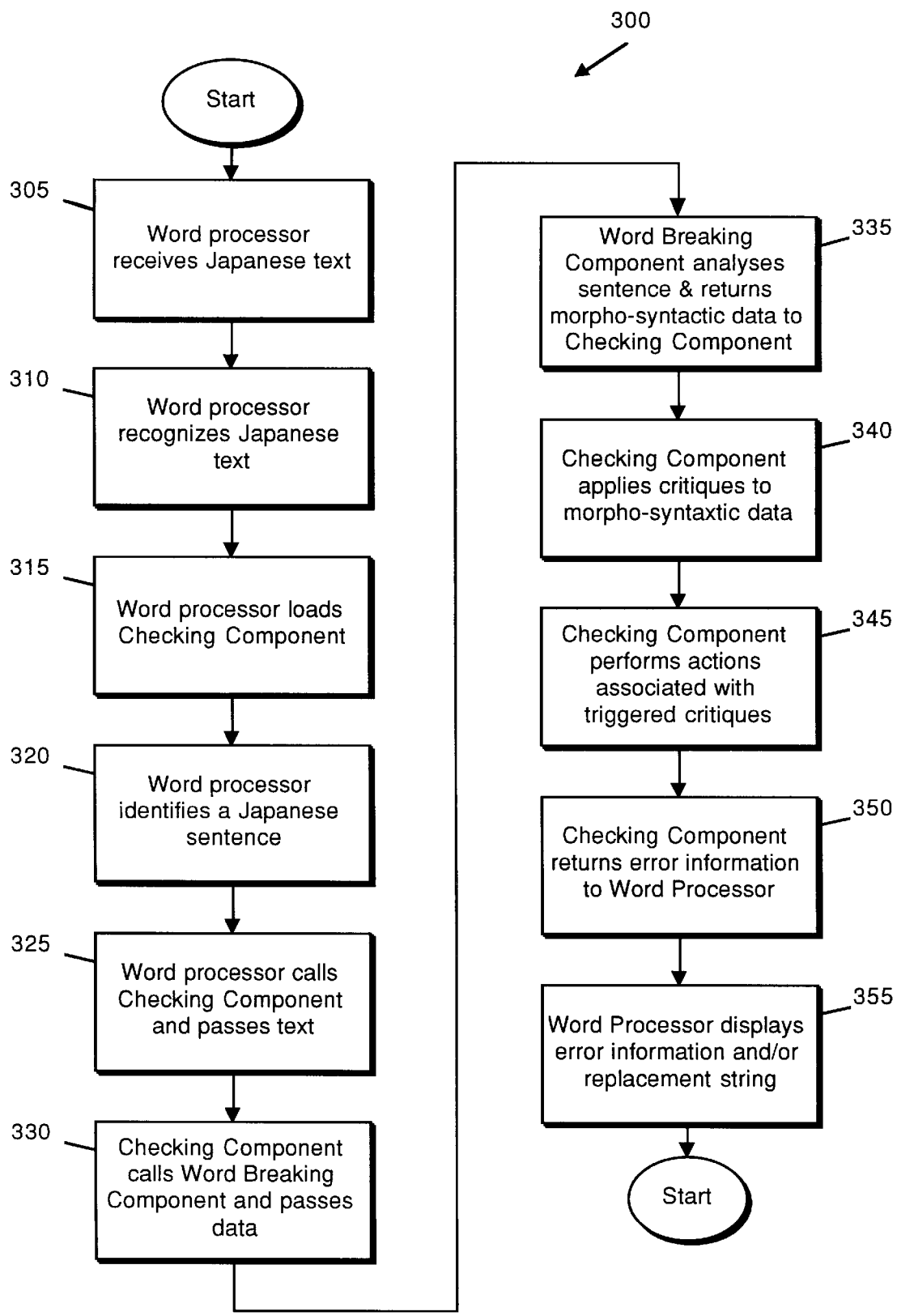
FIG. 3 is a flow diagram illustrating the functions carried out by the program modules of FIG. 2.

Each aspect of the present invention is described below in the context of an exemplary embodiment. In this embodiment, the style checker is implemented as two dynamic link libraries (DLLs) that are used in conjunction with a word processing program. FIGS. 2 and 3 illustrate the primary program modules that are employed and describe the interaction between the program modules. FIGS. 4a and 4b provide an example of a Japanese sentence and the morpho-syntactical data that results from an analysis of that sentence. The morpho-syntactical data breaks the sentence into constituent phrases and identifies attributes associated with each phrase. FIG. 5 provides examples of two critiques that may be applied to the morpho-syntactical data. Each critique includes a trigger and an action.

Figure 9:
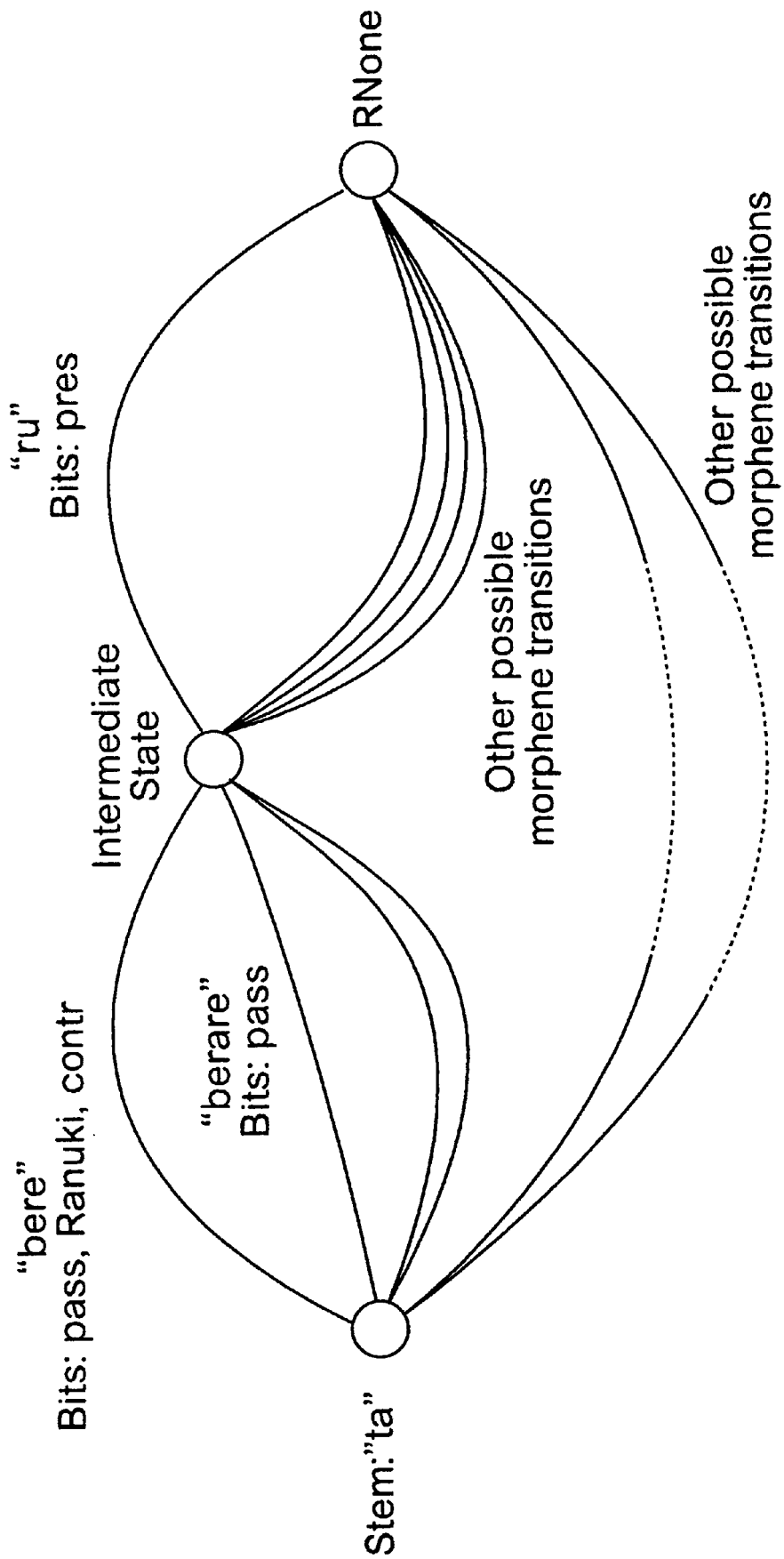
FIG. 9 illustrates a portion of a morphological graph associated with an example phrase of FIG. 8.

A primary feature of the invention relates to the generation of a replacement text string after a critique's trigger condition has been satisfied. The process of generating replacement text strings employs a morphological graph, which reflects possible word formations. The structure of the morphological graph is illustrated in FIGS. 6a–6g. FIG. 7 is a flow chart illustrating a method for traversing the morphological graph to generate a replacement text string. FIGS. 8 and 9 represent an example of how replacement text strings are generated. FIG. 8, consisting of FIGS. 8a and 8b, illustrates Japanese phrases, their constituent morphemes, and their attributes. FIG. 9 illustrates a portion of a morphological graph that may be used to generate a replacement string for the text of FIG. 8.

INTERACTION BETWEEN THE PRIMARY PROGRAM MODULES

FIGS. 2 and 3 illustrate the primary program modules employed in an exemplary embodiment of the present invention and the interaction between the program modules. FIG. 2 is a block diagram illustrating the program modules, which include a word processing application program 36, a checking component 37, and a word breaking component 202. The present invention provides a Japanese style checker for use with a word processing application program.

The word processing application program 36 is used to manipulate text, including Japanese text. An exemplary word processing application program 36 is the "MICROSOFT WORD" application program, which is published by Microsoft Corporation of Redmond, Washington. The checking component 37 and word breaking component together perform style checking and rewrite generation on Japanese text provided by the word processing application program 36. The word breaking component 202 analyzes a Japanese sentence and provides morpho-syntactical data that describes the word formation and syntax of the sentence. The morpho-syntactical information includes the sentence's constituent phrases and bits that reflect certain attributes of each phrase.

The checking component 37 applies critiques to the morpho-syntactical data in order to detect malformed phrases and generates replacement strings of text.

In an exemplary embodiment, the checking component 37 and word breaking component 38 are implemented as dynamic link libraries (DLL). A DLL is an executable routine, stored as an independent file, that can be loaded on an as-needed basis and called by other program modules. An application program can employ a DLL to perform a specific function, thereby eliminating the need for the application program to provide the function itself. In most cases, the application program and DLL will implement one or more application programming interfaces (APIs), which are used to allow one program module to call a function implemented by another program module, and to pass data between program modules.

FIG. 3 is a flowchart illustrating an exemplary method 300 for employing the program modules of FIG. 2 to perform Japanese style checking and rewrite generation. The method 300 begins at step 305 when Japanese text is typed into a word processing document or a document containing Japanese text is opened by the word processing application program 36 (FIG. 2). At step 310, the word processing application program 36 recognizes the presence of Japanese text and, at step 315, loads the checking component 37 and word breaking component 202, which are implemented as DLLs.

At step 320 the word processing application program 36 identifies a Japanese sentence. This results in the word processing application program 36 calling a function implemented by the checking component 37 and passing the sentence text to the checking component (step 325). In this embodiment, the checking component 37 then calls a function implemented by the word breaking component 202 and passes the text to the word breaking component (step 330). At step 335 the word breaking component 202 analyzes the Japanese sentence and returns the resulting morpho-syntactical analysis of the sentence to the checking component 37. The morpho-syntactical data reflects the morphology and the syntax of the sentence. The morphology describes word formation and the syntax describes the way in which words are put together to form phrases, clauses, or sentences.

At step 340 the checking component applies one or more critiques to morpho-syntactical data. The critiques are used to define and detect error classes. A critique is said to "trigger" if the trigger condition is satisfied by a phrase that is included in the morpho-syntactical data. At step 345 the checking component performs the actions that are associated with the triggered critiques. In most cases, this will involve generating replacement text strings using the morphological graph. This process is described below.

At step 350 the checking component returns the error information to the word processing application program. At step 355 the word processing application program displays the error information and/or replacement strings in a suitable manner.

The present invention operates primarily in the context of applying the critiques to the morpho-syntactical data (step 340) and performing the actions associated with the triggered critiques (step 350). These steps will be described more completely below. The word breaking component 202, which analyzes a sentence and provides the morpho-syntactical data, may be implemented in the manner described in copending U.S. patent application Ser. No. 08/672,638, entitled "*Identification of Words in Japanese Text by a Computer System*", filed Jun. 28, 1996, and assigned to Microsoft Corporation. The disclosure of this copending application is incorporated herein by reference.

MORPHO-SYNTACTICAL DATA AND CRITIQUES

The data provided by the word breaking component 202 (FIG. 2) is referred to as morpho-syntactical data. "Morphology" refers to the description of word formation in a language. "Syntactical" refers to the way in which words are put together to form phrases, clauses, or sentences. The term "morpheme" refers to an indivisible linguistic unit that contains no smaller, meaningful parts. A "stem" is a morpheme that can stand along and have meaning. A "bound morpheme" has no meaning apart from another morpheme, such as a stem. Prefixes and postfixes are examples of bound morphemes.

FIGS. 4a and 4b illustrate a Japanese sentence and the morpho-syntactical data that results from any analysis of that sentence. In this example, the sentence of FIG. 4a may be translated to mean "Today I will take the day off." FIG. 4b illustrates the morpho-syntactical data that would results from an analysis of the sentence by the word breaking component 202 (FIG. 2). The morpho-syntactical information provided by the word breaking component includes a list of phrases that constitute the analyzed sentence. For each phrase, the morpho-syntactical information includes the constituent morphemes, which can include a stem and one or more bound morphemes. The morpho-syntactical information also includes a list of bits that have been set (by the word breaking component) to identify syntactical attributes of the phrase. For example, bits may be set to indicate the tense of the phrase, passive voice, contracted form, and other attributes.

The morpho-syntactical data of FIG. 4b indicates that the sentence of FIG. 4a has been broken into three phrases, including phrase 1 405, phrase 2 410, and phrase 3 415. Each phrase in the morpho-syntactical data includes several lines. The first line of each phrase includes the stem 420, the normalized form of the stem 425, and one or more bits 430 that indicate the attributes of the phrase (e.g., contraction, tense, person, mood, voice, etc.) The last line of each phrase (which begins with an "=") includes a number that indicates the level of confidence that the phrase edge is correctly identified. This number is not discussed further inasmuch as it is not used in the context of the present invention. The lines between the first line and the last line of each phrase include information about bound morphemes that form a part of the phrase. In this example, the bound morphemes are postfixes 435 that define or determine the attributes of the phrase.

FIG. 5 illustrates two exemplary critiques. In the context of the present invention, the critiques are applied to the morpho-syntactical data of FIG. 4b. As described earlier, each critique includes a trigger 505 and an action 510, and are written in a special-purpose syntax that allows for easy specification of the error class and the rewrite generation. The trigger defines the condition that is being tested for. The action defines the parameters that will be applied to generate a rewrite text string.

In the case of Critique #1, the trigger indicates that the error class is defined broadly as phrases that include the "sairi" bit, which indicates the existence of a redundant morpheme "sa". If the sairi bit is present, the action portion of Critique #1 will cause the checking component 37 (FIG. 2) to generate a phrase having the same meaning but without the sairi bit set. In the case of Critique #2, the critique will check each phrase for the presence of the ranuki bit, which indicates that the phrase includes a specific type of contraction known as a "ra" contraction. If the ranuki bit is present, the action of Critique #2 will cause the checking component 37 (FIG. 2) to generate a phrase having the same meaning but without the ranuki and contraction bits set. The process of generating text strings is described in more detail below.

THE MORPHOLOGICAL GRAPH

In an exemplary embodiment, the present invention employs a morphological graph to generate the replacement text string. Those skilled in the art will appreciate that, in general, a graph may be defined as a data structure consisting of zero or more nodes linked together in an arbitrary fashion. The nodes are linked together by edges. A tree is a data structure that contains zero or more nodes linked together in a hierarchical fashion. The topmost node is called the root. The root can have zero or more child nodes, which are connected to the root by edges. Each child node can have zero or more child nodes of its own. In a tree, each node has exactly one parent node, and there is one, and only one, path from the root node to any other node in the tree. In a tree, a leaf refers to the node at the end of a branch.

In an exemplary embodiment, the present invention employs a morphological graph. Those skilled in the art will appreciate that the graph is not a tree because, as illustrated below, the nodes are not linked in a strict hierarchical fashion and each node may have more than one parent.

FIGS. 6a–6g illustrate features of a morphological graph of the type used to generate replacement text strings. The manner in which the graph is traversed is described in detail in conjunction with the flow chart of FIG. 7 and the example of FIGS. 8–9.

FIG. 6a illustrates the basic components of a morphological graph, including morpheme states (referred to as Morpheme State A and Morpheme State B) and the edge or transition between the morpheme states (Morpheme Transition). This figure illustrates the basic premise that a morpheme transition connects two morpheme states. FIG. 6b is similar to FIG. 6a, but includes two morpheme transitions (Morpheme Transition #1 and Morpheme Transition #2) between the left and right morpheme states. This Figure illustrates that multiple morpheme transitions can exist between morpheme states.

Figure 6C:
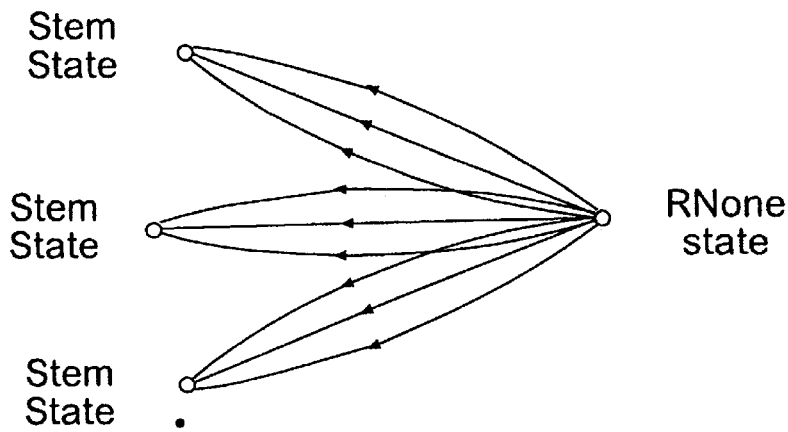
FIG. 6, consisting of FIGS. 6a–6g, illustrates a morphological graph of the type used to generate replacement text strings.
Figure 7:
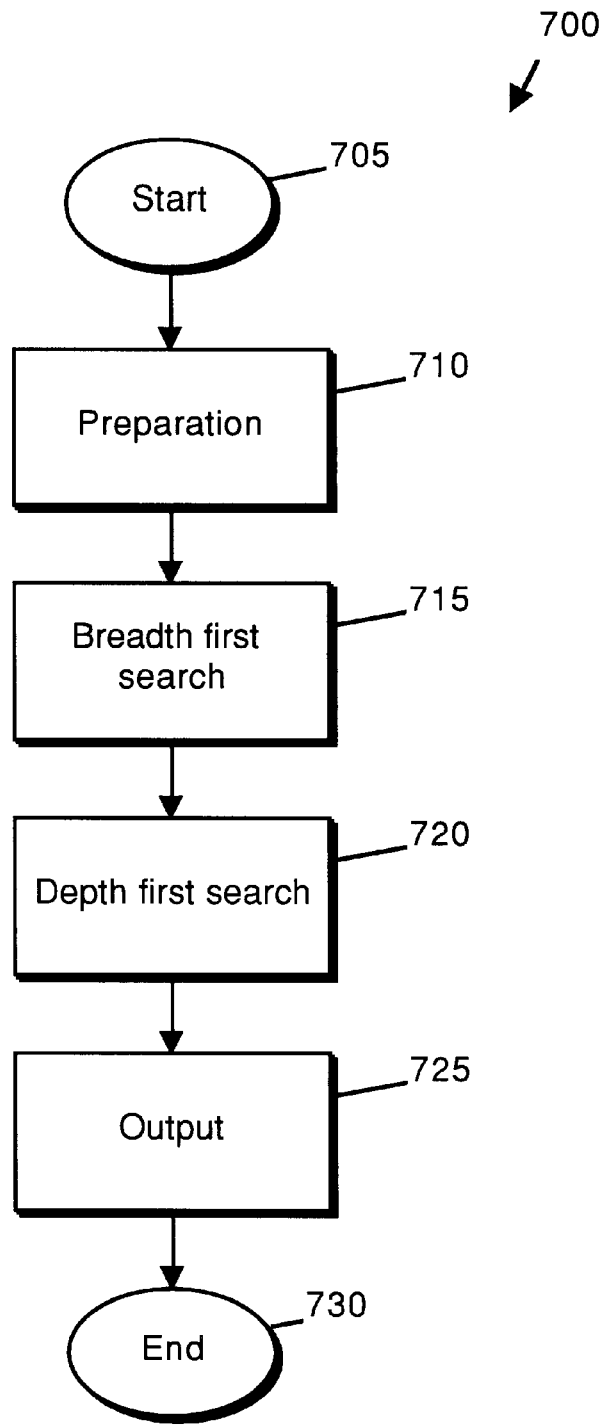
FIG. 7 is a flow diagram illustrating an exemplary method for generating replacement text strings.

FIG. 6c illustrates a simple morphological graph that includes left nodes labeled "Stem State" and a right node labeled "RNone." In this example, the RNone state represents the rightmost edge of a phrase, and forms the beginning point for the generation operation. The stem states represent stems. In this figure, there is only one morpheme transition between the stem states and the RNone state. An example of a phrase that has only one morpheme transition is "tabe(stem)+ru(ending), which means "to eat".

Figure 6D:
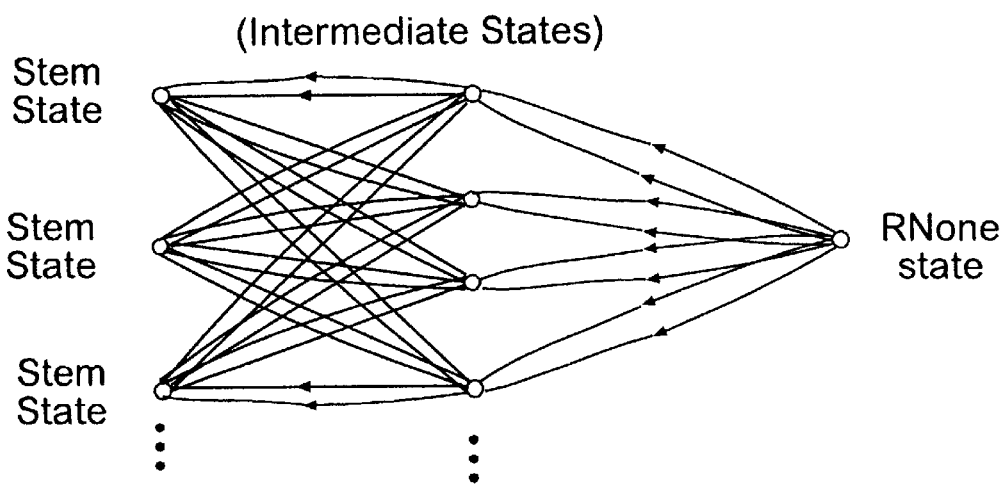
Figure 6E:
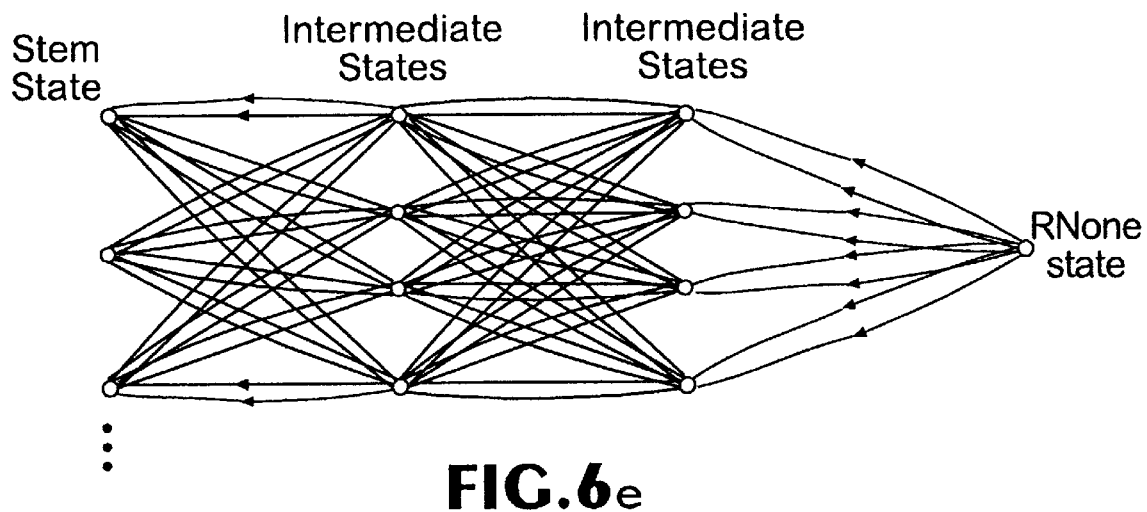

Those skilled in the art will appreciate that there may be multiple morpheme transitions between a stem and the RNone state. FIGS. 6d and 6e depict morphological graphs with two morpheme transitions and three morpheme transitions, respectively, between the stem states and the RNone state. Morphological graphs with two or more morpheme transitions include intermediate states between the left and right morpheme states.

Figure 6F:
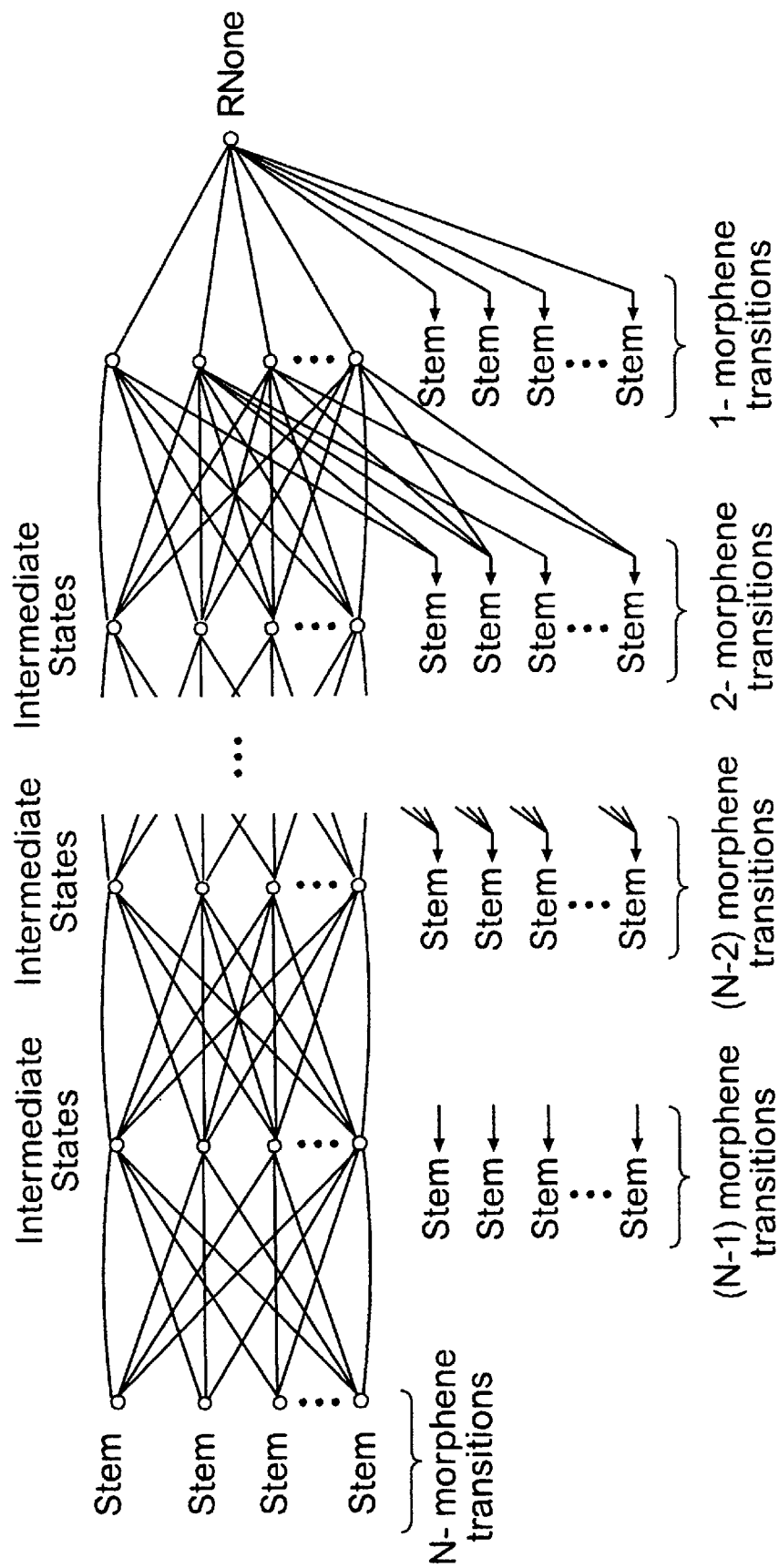
Figure 6G:
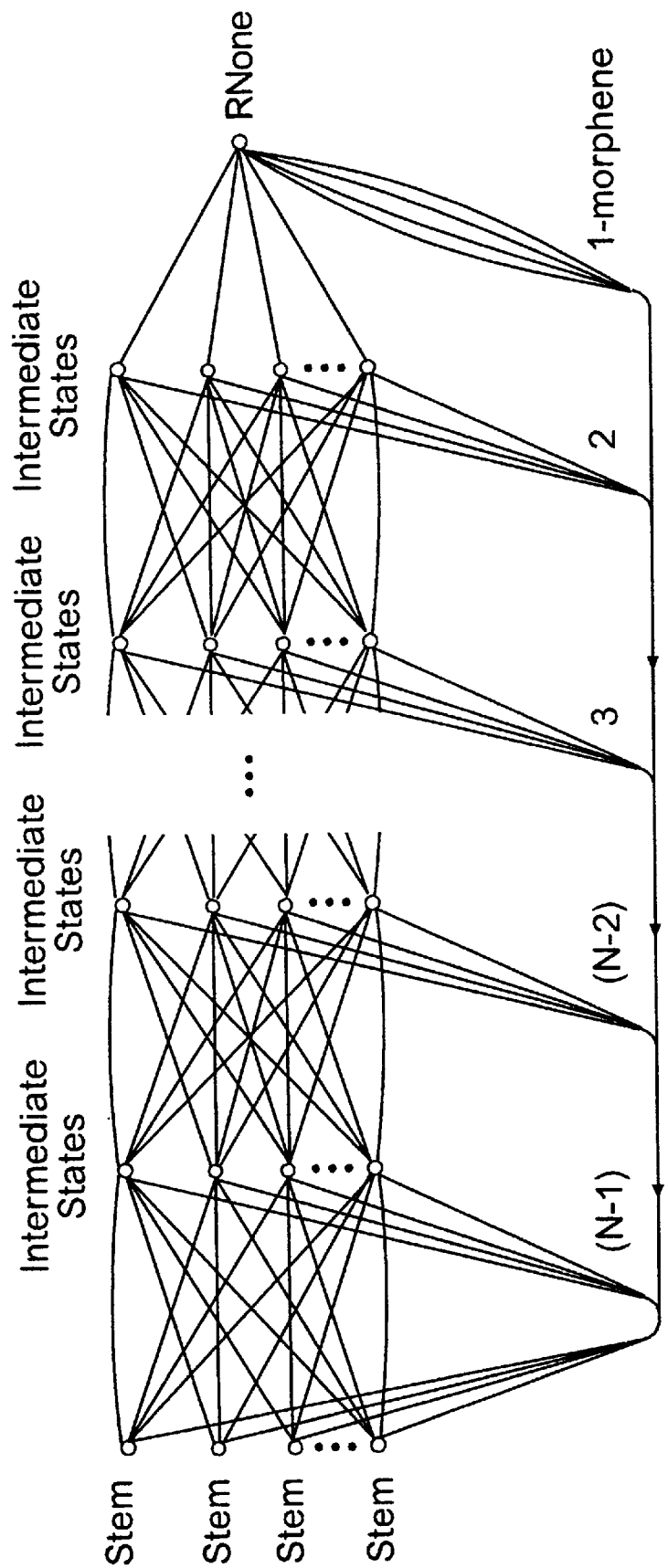

FIG. 6f combines the attributes of the previously described morphological graphs into a single graph, where there are stem states with various numbers of morpheme transitions (and intermediate states) between the stem states and the RNone state. FIG. 6g is a alternate representation of the graph of FIG. 6f. FIG. 6g illustrates that the graph may be traversed in many different ways and through a variety of morpheme transitions to traverse the path between the RNone state and a stem state.

In the context of the present invention, the morphological graph includes morpheme states(nodes) and morpheme transitions(edges) connecting the morpheme states, and is created by linguists who specialize in Japanese language.

A METHOD FOR USING THE MORPHOLOGICAL GRAPH TO GENERATE REPLACEMENT TEXT STRINGS

The present invention provides a method for using a morphological graph of the type described above to generate replacement text strings. As illustrated in step 345 of FIG. 3, the generation process takes place after one or more critiques have been applied to the morpho-syntactical data and a trigger condition has been satisfied by a phrase.

FIG. 7 is a flow diagram illustrating the method 700 that is employed to generate a replacement text string. After a general discussion of the method, these steps will be illustrated in the context of the example of FIGS. 8 and 9.

The method 700 begins at step 705 when a critique has been triggered and the action calls for generation of a replacement text string.

At step 710 the method prepares for the traversal of the morphological graph. This is done by forming a morpheme list (m-list) and a bit list (b-list) that are used throughout the generation process. The first step in preparing the m-list and b-list is to populate the lists with the attributes of the original phrase. This attribute information is provided for each phrase in the morpho-syntactical data provided by the word breaking component. The m-list will includes the morphemes that were found in the original phrase. The b-list will include any bits that are not already represented by the included morphemes. In many cases, the morphemes in the original text will completely and uniquely define the original string's attributes. Therefore, it is likely that the m-list will include the morphemes in the original phrase and the b-list will be empty.

The second part of the preparation step is to alter the m-list and b-list based on the action required by the critique. This may require that morphemes or bits be added to or deleted from the m-list and b-list. In many cases, this will require deleting from the m-list a morpheme that includes the offending attribute, while adding any remaining, unoffending attribute to the b-list. For example, the action may require that a replacement string be generated without a contracted form of the word. If, for example, a morpheme in the m-list represents, by definition, the past tense and contracted form, the m-list will be altered by deleting the morpheme, which includes the contraction attribute, and adding a present tense bit (the unoffending attribute) to the b-list.

The morphemes that remain in the m-list are retained in their original order for the purpose of providing a template for the rewrite that will be generated. Any new morphemes added during the generation process will be placed between the retained original morphemes. It is also important to understand that it is preferable to perform the subsequent steps (the breadth first search and the depth first search) using morphemes where possible instead of bits. This is because morphemes have a one to one correspondence to the morpheme transitions in the morphological graph. In contrast, the process of using bits is not as constrained (because there may be many paths that satisfy the attribute) and requires more time to perform.

After the m-list and b-list are prepared, the method 700 proceeds to step 715 and performs a breadth first search. During the breadth first search, the analysis begins at the RNone state and proceeds through the morphological graph from right to left toward the target stem. During the traversal, the breadth first search enforces a strict "no extra bits" policy and follows only those paths that represent attributes found in the m-list or b-list. The breadth first search is completed when the traversal arrives at the target stem and has used up (or encountered) all of the morpheme transitions in the m-list. At that point, the breadth first search retains only the intermediate states or nodes it has encountered, but not the edges that were followed between nodes. This reduces the amount of data that must be retained by the program. The traversed node information is used in the next step, which is the depth first search.

At step 720 the method traverses the morphological graph a second time using a depth first search. The depth first search uses the node information from the breadth first search and proceeds from left to right through the morphological graph. In general, the depth first search will proceed from the stem to the RNone state along the nodes provided by the breadth first search. The depth first search will proceed along only those morpheme transitions that match attributes of the m-list or b-list. The depth first search will not follow morpheme transitions that would allow any extra bits to be "added" during the traversal. The depth first search continues until it arrives at the RNone state and has encountered morpheme transitions that satisfy all of the morphemes in the m-list and all the bits in the b-list. In other words, all of the attributes reflected in the m-list and b-list must be satisfied by the morpheme transitions encountered during the depth first search. This process allows the program to identify one or more morphemes that are suitable for use in the replacement string as substitutes for the offending morpheme or morphemes.

As mentioned earlier, any solution arrived at during the depth first search must keep the retained original morphemes in their original order. This requires that during the depth first search the elements of the m-list must be found in order. The elements in the b-list can be found in any order during the depth first search.

Those skilled in the art will appreciate that the present invention employs graph searching techniques in a way that provides an advantageous result. The present invention is superior to prior techniques because the present invention reduces the amount of data that is retained by not saving all of the edges that are traveled during the breadth first search. The speed of the depth first search process is improved by constraining the solution to match the order of the retained original morphemes, which act like a template for the eventual solution.

After the depth first search is completed, the method 700 proceeds to step 725 and provides a replacement string that includes the morphemes identified during the depth first search step. This replacement string is passed from the checking component to the word processing application program, where it may be displayed to the user for his or her consideration.

AN EXAMPLE OF TEXT GENERATION

FIGS. 8 and 9 provide an example of how the method 700 of FIG. 7 may be used to generate replacement text. In FIG. 8a, the sample text is the Japanese phrase "taberuru," which is a contracted form of "taberareru" and means "can be eaten, edible". Its normal form "taberareru" is also illustrated in FIG. 8b. FIG. 8a also illustrates the morpho-syntactical attributes of the phrase. These attributes would be included in the morpho-syntactical data provided by the word breaking component 202 (FIG. 2). The morpho-syntactical data indicates that the phrase "taberuru" consists of the stem "ta" and the bound morphemes "bere" and "ru". The morpho-syntactical data indicates that the morpheme "bere" means the phrase is passive and includes a specific species a contraction known as a "ra contraction." The morpho-synbtactical data indicates that the morpheme "ru" means the phrase is present tense. The ranuki, contr, passive, and pres bits will be set by the word breaking component and included in the morpho-syntactical data.

If Critique #2 of FIG. 5 is applied to the morpho-syntactical data of FIG. 8a, the critique will be "triggered" because of the presence of the ranuki bit in the morpho-syntactical data. At that point, the action portion of the critique instructs the checking component to generate a replace string in which the contraction and ra contraction have been removed. In essence, this critique is looking for informal speech that includes contractions and replacing that text with a more formal choice of words.

During the preparation step (step 710 of FIG. 7), the checking component will prepare the m-list and b-list based on the attributes identified in the morpho-syntactical data. In this example, the original m-list would be populated as follows:

| Original | | |
|---|---|---|
| m-list: | bere | ru |
| b-list: | (empty) | |

The b-list is empty at this point because the morphemes "bere" and "ru" include all of the attributes reflected in the data of FIG. 8a.

The second part of the preparation step is to alter the m-list and b-list based on the action required by the critique. In this example, the action requires removing the contraction, which corresponds to removing the "ranuki" and "contr" bits. Because the "ranuki" and "contr" bits are implicit in the morpheme "bere," the morpheme "bere" is removed from the m-list and the remaining, non-offending bits (if any) are placed in the b-list. In this example, the morpheme "bere" also includes the passive attribute (indicated by the "pass" bit), so "bere" is removed from the m-list and the "pass" bit is added to the b-list, as shown below:

| Revised | |
|---|---|
| m-list: | ru |
| b-list: pass | |

After the m-list and b-list are revised as shown, the method 700 proceeds to step 715 and performs the breadth first search. FIG. 9 illustrates a portion of a morphological graph that includes the stem "ta," the RNone state, an intermediate state, and several morpheme transitions that connect the stem to the RNone state.

In this example, the search will begin at the RNone state and traverse the graph from right to left until it reaches the stem "ta." As mentioned earlier, the breadth first search employs a strict "no extra bits" policy and follows only those paths that represent bits found in the m-list or b-list. Thus, the search will proceed from the RNone state to the intermediate state along the "ru" morpheme transition. Those skilled in the art will appreciate that although there may be other morpheme transitions between the RNone state and the intermediate state, the "ru" edge is preferred because it corresponds to an element of the m-list.

From the intermediate state, the search can only take the "berare" transition to reach the target stem state, since "bere" transition has two extra bits Ranuki and contr which would violate "no extra bits" policy.

At this point, the breadth first search has reached the target stem state via morpheme transitions that represent attributes found in the m-list or b-list, and all of the morphemes in the m-list (namely, "ru") have been encountered along the path. At this point, the breadth first search is complete and the checking component remembers the nodes that have been traversed. In this case, the only node that was traversed between the stem state and the RNone state is the intermediate state. The morpheme transitions that were followed are not retained for subsequent use by the checking component. By taking this approach, the amount of data that must be retained is reduced at the expense of an additional search by the second pass.

The checking component now proceeds to step 720 (FIG. 7) and performs the depth first search. The depth first search uses the node information from the breadth first search and proceeds from left to right through the morphological graph. As mentioned earlier, the depth first search will proceed from the stem to the RNone state along the nodes provided by the breadth first search. The depth first search will not allow any extra bits to be "added" during the traversal, and will continue until it arrives at the RNone state and has used up all the morphemes in the m-list and all the bits in the b-list. In other words, all of the attributes reflected in the m-list and b-list must be satisfied by during the depth first search. This process allows the program to identify one or more morphemes that are suitable for use in the replacement string as substitutes for the offending phrase or phrases.

In this example, the depth first search begins at the stem "ta" and attempts to arrive at the intermediate state, which was traversed by the breadth first search. In choosing a transition between the stem state and the intermediate state, the depth first search ensures that no extra bits are added. This results in the "berare" morpheme transition being chosen because it includes only the "pass" bit, which is included in the b-list. The "bere" morpheme transition may not be chosen because it includes bits that are not found in the b-list (i.e., the "contr" and "ranuki" bits).

To get from the intermediate state to the RNone state, the depth first search chooses the "ru" morpheme transition because it corresponds to a morpheme in the m-list. As mentioned earlier, any solution arrived at during the depth first search must keep the retained original morphemes in their original order. This requires that during the depth first search the elements of the m-list must be found in order. The elements in the b-list can be found in any order during the depth first search.

After the depth first search is completed, the checking component proceeds to step 725 (FIG. 7) and provides an output that includes a replacement text string. The replacement text string includes the morphemes identified during the depth first search step. In this example, the replacement string will be "taberareru." This replacement string is passed from the checking component to the word processing application program, where it may be displayed to the user for his or her consideration.

From the foregoing description, it will be appreciated that the present invention provides an improved method for detecting stylistic errors and generating replacement strings in documents containing Japanese text. A principle benefit of the present invention is that minimizes both the time required to generates a replacement text string and the amount of data that must be stored during the generation process.

The embodiments described above employ critiques that are applied to phrases that are found in morpho-syntactical information derived from the Japanese text. The critiques include a "trigger" and an "action," and are written in a special-purpose syntax that allows for easy specification of the error class and the rewrite generation. If a critique's trigger condition is satisfied, the associated action is carried out in order to generate a replacement text string. The process of generating replacement text strings employs a morphological graph, which reflects possible word formations. A first pass through the graph employs a breadth first search to identify intermediate nodes along a path whose morpheme transitions satisfy at least part of the attributes of the text. A second pass employs a depth first search to select only those morpheme transitions that completely satisfy the rewrite criteria specified in the critique, while traversing the nodes identified in the breadth first search. The morpheme transitions identified during the depth first search provide the text string that is used to replace the original phrase.

The invention may be implemented in one or more program modules that are based upon and implement the processes and features illustrated in FIGS. 2, 3, and 5–9. No particular programming language has been described for carrying out the various processes described above because it is considered that the operations, steps, and procedures described above and illustrated in the accompanying drawings are sufficiently disclosed to permit one of ordinary skill in the art to practice the present invention. Moreover, there are many computers and operating systems that may be used in practicing the present invention and therefore no detailed computer program could be provided that would be applicable to all of these many different systems. Each user of a particular computer will be aware of the language and tools which are most useful for that user's needs and purposes.

In addition, although the invention was described in the context of processing Japanese sentences, those skilled in the art will appreciate that the present invention may be applied to other languages and to other groupings of text. Similarly, although the foregoing example addressed the problem of removing contraction, the present invention may be used to detect and alter other morphological attributes of the text. Finally, those skilled in the art will appreciate that the foregoing description of the use of morphological graphs, morpho-syntactical data, and breadth first and depth first searching does not preclude the use of other graph searching techniques or other representations of word formations and text attributes.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for generating a substitute text string, comprising the steps of:

providing a morphological graph including a first state, a last state, and at least one morpheme transition between the first state and the last state;

receiving morpho-syntactical data associated with an original phrase, the morpho-syntactical data including a stem corresponding to the first state, at least one bound morpheme, and attribute bits describing the original phrase;

applying a critique to the morpho-syntactical data, the critique including a trigger and an action;

determining whether the trigger is satisfied by the morpho-syntactical data; and if the trigger is satisfied, performing the steps of:

preparing a morpheme list and a bit list corresponding to the action;

traversing the morphological graph by a first pass from the last state to the first state in a breadth-first manner, with a graph path of the first pass being determined by the contents of the morpheme list and the bit list;

traversing the morphological by a second pass from the first state to the last state in a depth-first manner, with a reconstructed graph path being determined by nodes of the graph path of the first pass; and providing a substitute string corresponding to the reconstructed path.

2. The method of claim 1, wherein the substitute string includes the stem and replacement morphemes, the replacement morphemes being derived from the reconstructed path and corresponding to the morpheme transitions traversed along the reconstructed path.

3. The method of claim 1, wherein the first state corresponds to a stem and the last state corresponds to the rightmost edge of a phrase.

4. The method of claim 1, wherein the trigger defines a test condition associated with the attribute bits.

5. The method of claim 1, wherein preparing a morpheme list and a bit list comprises the steps of:

preparing an initial morpheme list and an initial bit list corresponding to state of morpho-syntactical data; and altering the initial morpheme list and the initial bit list in accordance with the action.

6. A computer-readable medium, comprising:

morphological graph data representing a first state, a last state, and at least one morpheme transition between the first state and the last state; and computer-executable instructions for performing steps comprising:

applying a critique to morpho-syntactical data associated with an original phrase, the critique including a trigger and an action, the morpho-syntactical data including a stem corresponding to the first state, at least one bound morpheme, and attribute bits describing the original phrase;

determining whether the trigger is satisfied by the morpho-syntactical data;

preparing a morpheme list and a bit list corresponding to state of morpho-syntactical data;

altering the morpheme list and the bit list in accordance with the action;

traversing the morphological graph data by a first pass from the last state to the first state in a breadth-first manner, with a graph path of the first pass being determined by the contents of the morpheme list and the bit list;

traversing the morphological graph by a second pass from the first state to the last state in a depth-first manner, with a reconstructed graph path being determined by nodes of the graph path of the first pass; and providing a substitute string corresponding to the reconstructed path, the substitute string including the stem and replacement morphemes, the replacement morphemes being derived from the path and corresponding to the morpheme transitions traversed along the path.

7. The method of claim 6, wherein the first state corresponds to a stem and the last state corresponds to the rightmost edge of a phrase.

8. The method of claim 6, wherein the trigger defines a test condition associated with the attribute bits.

9. A computer-implemented method for generating a substitute text string, comprising the steps of:

providing a morphological graph including a stem state, a RNone state, and at least one morpheme transition between the stem state and the RNone state;

receiving morpho-syntactical data associated with an original phrase, the morpho-syntactical data including a stem corresponding to the stem state, at least one bound morpheme, and attribute bits;

applying a critique to the morpho-syntactical data, the critique including a trigger defining a test condition and an action to be taken is the test condition is satisfied;

determining whether the test condition is satisfied by the morpho-syntactical data; and if the test condition is satisfied, performing the steps of:

preparing a morpheme list and a bit list corresponding to state of morpho-syntactical data;

altering the morpheme list and the bit list in accordance with the action;

traversing the morphological graph by a first pass from the RNone state to the stem state in a breadth-first manner, with a graph path of the first pass being determined by the contents of the morpheme list and the bit list;

traversing the morphological by a second pass from the stem state to the RNone state in a depth-first manner, with a reconstructed graph path being determined by nodes of the graph path of the first pass; and providing a substitute string including the stem and replacement morphemes, wherein the replacement morphemes are derived from the reconstructed path and correspond to the morpheme transitions traversed along the path.

10. The method of claim 9, wherein the graph path of the first pass comprises a plurality of the nodes, including at least one intermediate node.

* * * * *